United States Patent [19]

Gjertsen et al.

[11] Patent Number: 4,717,527

[45] Date of Patent: * Jan. 5, 1988

[54] FUEL ASSEMBLY

[75] Inventors: Robert K. Gjertsen, Monroeville; Elmer A. Bassler, North Huntingdon; Edgar A. Huckestein, Edgewood; Robert B. Salton, Plum Boro.; Stephen N. Tower, Washington Township, Westmoreland County, all of Pa.

[73] Assignee: Westinghouse Electric Corp., Pittsburgh, Pa.

[*] Notice: The portion of the term of this patent subsequent to Sep. 15, 2004 has been disclaimed.

[21] Appl. No.: 626,847

[22] Filed: Jul. 2, 1984

[51] Int. Cl.⁴ .................. G21C 1/06; G21C 7/22; G21C 15/02; G21C 19/28
[52] U.S. Cl. .................. 376/209; 376/221; 376/329; 376/353; 376/363; 376/364; 376/399
[58] Field of Search .............. 376/209, 221, 229, 327, 376/328, 329, 331, 353, 363, 364, 395, 399, 444, 446, 447, 456

[56] References Cited

U.S. PATENT DOCUMENTS

| | | | |
|---|---|---|---|
| 3,081,246 | 3/1962 | Edlund | 376/171 |
| 3,212,984 | 10/1965 | Tollet et al. | 376/209 |
| 3,247,068 | 4/1966 | Schluderberg et al. | 376/177 |
| 3,247,074 | 4/1966 | Schluderberg et al. | 376/209 |
| 3,255,087 | 6/1966 | Maldague | 376/350 |
| 3,261,755 | 7/1966 | Mostert | 376/219 |
| 3,275,521 | 9/1966 | Schluderberg et al. | 376/177 |
| 3,386,886 | 6/1968 | Whittier | 376/209 |
| 3,624,241 | 11/1971 | Power | 376/328 |
| 4,313,797 | 2/1982 | Attix | 376/441 |
| 4,326,921 | 4/1982 | Cadwell | 376/353 |
| 4,489,038 | 12/1984 | Nylund | 376/446 |
| 4,521,374 | 6/1985 | Duncan | 376/462 |
| 4,526,744 | 7/1985 | Borrman et al. | 376/440 |
| 4,526,746 | 7/1985 | Fredin | 376/444 |

FOREIGN PATENT DOCUMENTS

| | | | |
|---|---|---|---|
| 2005391 | 8/1971 | Fed. Rep. of Germany | |
| 1117315 | 6/1968 | United Kingdom | 376/209 |

Primary Examiner—John F. Terapane
Assistant Examiner—Eric Jorgensen
Attorney, Agent, or Firm—Daniel C. Abeles

[57] ABSTRACT

A fuel assembly for a pressurized water nuclear reactor incorporating fluid moderator spectral shift control means. During the first part of the fuel cycle when there is excess reactivity, neutron moderation may be decreased by replacing a portion of the water within the core with a less effective moderator such as heavy water. During the life of the fuel, the heavy water is gradually replaced with regular water. The fuel assembly incorporates the necessary means and apparatus to effectuate such control.

10 Claims, 8 Drawing Figures

FUEL ASSEMBLY

CROSS-REFERENCES TO RELATED APPLICATIONS

This application is related to copending application Ser. Nos. 626,843, entitled "Fluid Moderator Control System-D$_2$O/H$_2$O" by R. A. George, et al, filed July 2, 1986; 626,942, entitled "Fluid Moderator Control System Fuel Assembly Seal Connector" by L. Veronesi, et al, filed July 2, 1984; and 626,943, entitled "Fluid Moderator Control System-Reactor Internals Distribution System" by H. F. Fensterer, et al, filed July 2, 1984; all of which are assigned to the Westinghouse Electric Corporation.

BACKGROUND OF THE INVENTION

1. Field of the Invention

This invention relates in general to the field of pressurized water nuclear reactors and in particular to a fuel assembly for a pressurized water reactor employing a fluid moderator system for purposes of spectral shift control.

2. Description of the Prior Art

In typical pressurized water nuclear reactors, control over the fission process, or reactivity control is accomplished during reactor operation by varying the amount of neutron-absorbing materials within the core of the reactor. One method to effectuate reactivity control is by the use of control rods containing such neutron absorbing materials or poisons which are inserted within the reactor core. Control over the fission process may be accomplished by varying the number of control rods, the size of the control rods and their radial and axial locations within the core. Burnable poisons (by the fissioning process) and poisons dissolved in the reactor coolant can additionally be used for purposes of such control.

In order to lengthen the core life, it is typical, in conventionally designed commercial pressurized water reactors, to design in an excess of reactivity at reactor start-up. The excess reactivity is controlled as stated above, and is gradually depleted over the extended life of the core. Soluble boron, dissolved in the reactor coolant is most often used to control the initial excess reactivity. As the excess reactivity in the core is depleted during the reactor operation, the neutron absorbing boron is gradually removed so as to utilize the original excess reactivity to maintain the fission process. While this control arrangement provides an effective means of controlling a nuclear reactor over an extended core life, the neutron absorbing boron used during core life absorbs neutrons and removes reactivity from the reactor core that could otherwise be used in a more productive manner. For example, the reactivity could be used to convert fertile material to plutonium or to fissile uranium which even further extends the reactor core life by fissioning the then generated fissile material. Without such conversion, however, the consumption of reactivity is an inefficient depletion of uranium resulting in higher fuel costs than would otherwise result. In view of the above, it would be an obvious advantage to be able to extend the life of a core having an initial amount of excess reactivity while not suppressing the excess reactivity with neutron absorbing materials, but rather using the excess reactivity in a positive manner thereby providing an extended core life with a significantly lower overall fuel cost.

It is well known that fuel element enrichment can be reduced and the conversion ratio of producing fissile materials can be increased by employing a "hardened" (higher neutron energy) spectrum during the first part of the fuel cycle to reduce excessive reactivity and to increase the conversion of fertile material to fissile material; then employing a "softer" (lower energy) neutron spectrum during the latter part of the fuel cycle to increase reactivity and extend the core life by fissioning the previously generated fissile material. One such method utilizing the above is known as spectral shift control which provides a reactor with an extended core life while reducing the amount of neutron absorbing material in the reactor core. In this art, the reduction of the excess reactivity, and, therefore, the neutron absorbing material, is achieved by replacing a portion of the ordinary reactor water with heavy water.

The heavy water is a less effective moderator than the ordinary reactor coolant water. This retards the chain reaction by shifting the neutron spectrum to higher energies permitting the reactor to operate at full power with reduced neutron absorbing material. This shift to a hardened neutron spectrum causes more fertile U-238 or Th-232 to be converted to fissile Pu-239 or U-233, respectively, that may thereafter be consumed in the reactor core producing heat and further extending the core life. Thus, the shift to an initially hard spectrum results in more neutrons being consumed in a useful manner rather than being wasted by the use of poisons. As the fissile material is consumed, the heavy water is gradually replaced with ordinary reactor coolant water creating a softer neutron spectrum whereby the core reactivity is maintained at a proper level. At the end of core life, essentially all of the heavy water has been replaced by the ordinary reactor coolant water. Thus, the reactor can be controlled by control rods without the use of additional neutron absorbing material and without the use of excess reactivity at start-up, resulting in significant uranium fuel cost savings. The additional Pu-239 or U-233 production also reduces the U-235 enrichment requirements.

While the spectral shift control is well known in theory, there exists a need to carry the theory into effect. To date, no apparatus exists which effectively and practically implements such theory.

It is, therefore, a primary object of the present invention to provide a fuel assembly for a pressurized water nuclear reactor which includes means for varying the reactor coolant water volume over a fuel cycle by replacing a portion of the water with heavy water during the early stages of core life and then gradually reducing the amount of heavy water and replacing it with ordinary water as the core life decreases.

SUMMARY OF THE INVENTION

The present invention comprises a fuel assembly for a pressurized water nuclear reactor having the capability of varying the amount of deuterium oxide or heavy water within the fuel assembly, thereby allowing for varying the core light water volume over the life of the fuel elements. The fuel element assembly comprises a square array of parallel arranged fuel elements having a plurality of moderator control tubes (MCT) and rod control cluster (RCC) guide tubes interspersed among the fuel elements. The fuel elements, MCTs, and the RCC guide tubes are spaced and supported by a plurality of axially arranged grids. Top and bottom manifolds respectively positioned at the upper and lower fuel assembly nozzles are employed to direct the flow of heavy water into and out from the moderator control tubes. Seal connectors appropriately attached to the manifolds maintain the separation of heavy water and light water (H$_2$O) within the reactor and permits the D$_2$O and the H$_2$O or D$_2$O/H$_2$O mixture to be circulated into and out of the core MCTs. Adaptor plates comprising structural elements are located at the top and bottom nozzle to structurally combine the various components within the fuel assembly. During the first part of a fuel cycle where there is excess reactivity, neutron moderation is decreased by replacing some of the light water in the core with the less effective moderator, heavy water. During the last part of the fuel cycle, the process is reversed and regular water is added to the core by diluting the heavy water with regular water. This process occurs within the fuel assembly.

BRIEF DESCRIPTION OF THE DRAWINGS

For a more complete understanding of the invention, reference is had to the following description taken in conjunction with the accompanying drawings in which.

DESCRIPTION OF THE PREFERRED EMBODIMENTS

Figure 1:
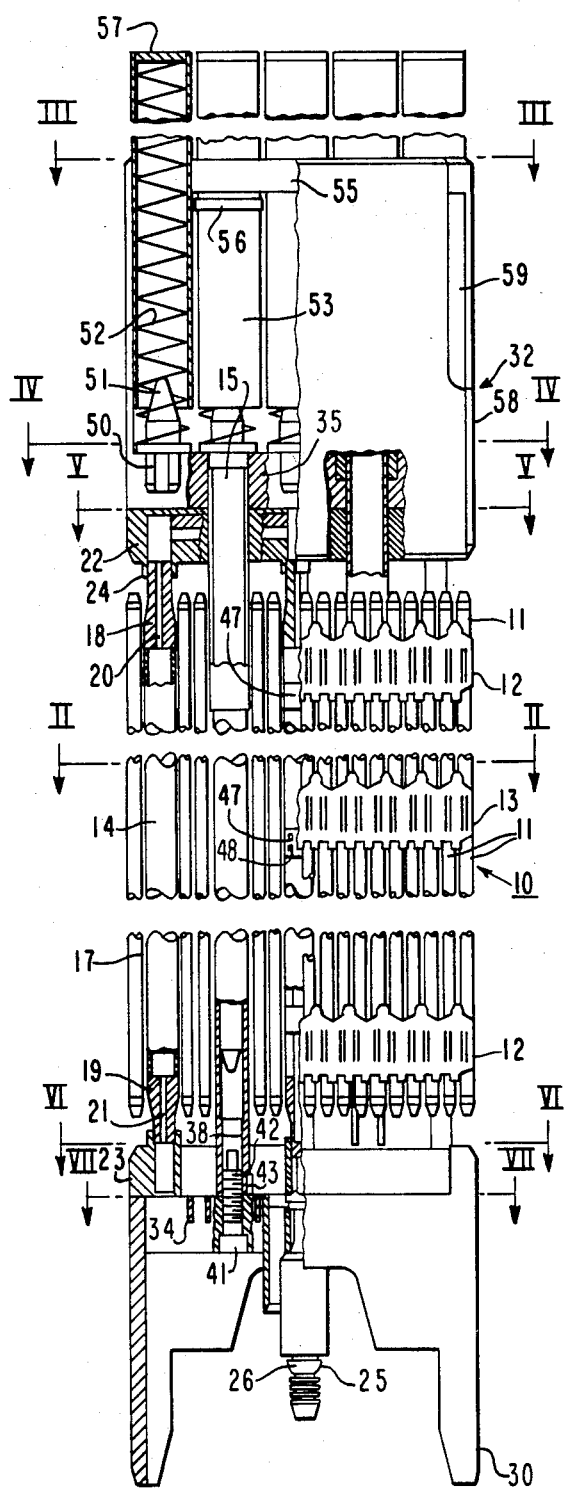
FIG. 1 is a vertical, partially cross-sectioned view of one embodiment of the inventive fuel assembly.

Referring now to FIG. 1 of the drawings, there is depicted therein one embodiment of the inventive fuel assembly generally designated by the numeral 10. A plurality of parallel arranged fuel elements 11 are held in place by upper and lower Inconel grids 12 and a plurality of intermediate Zircaloy grids 13. Grids 12 and 13 serve also to space and support twenty-one moderator control tubes 14, and four rod cluster control tubes or guide thimbles 15.

Figure 2:
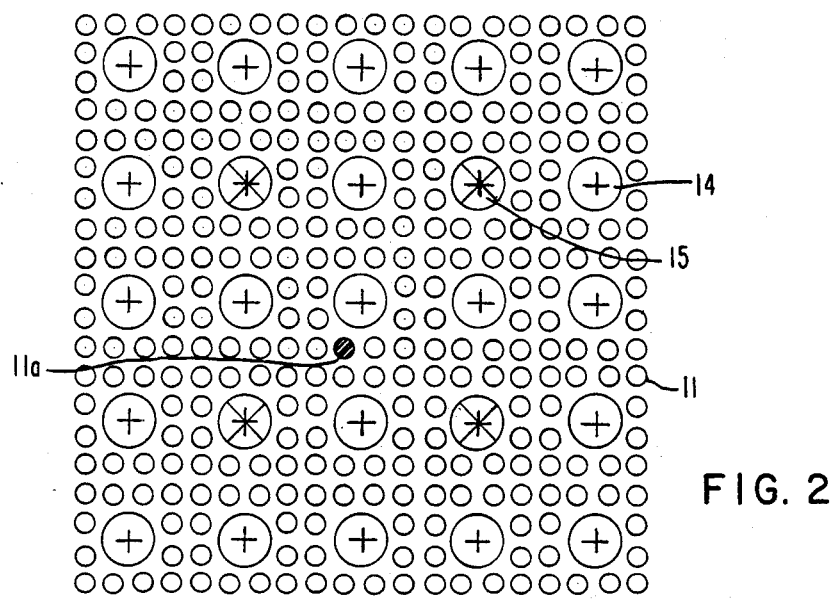
FIG. 2 is a cross-sectional view taken along the line 2—2 of FIG. 1, not showing the grids.

The cross-sectional arrangement of the above-noted components is shown in FIG. 2. Each fuel element 11 comprises elongated cylindrical metallic tubes containing nuclear fuel pellets and having both ends sealed by appropriately shaped end plugs. Such fuel elements are well known in the art. In the embodiment, shown in FIG. 2, fuel elements 11 are arranged in a substantially 20×20 square array with an equal pitch between adjacent fuel elements 11. One fuel element 11a may be used for purposes of instrumentation. Each moderator control tube 14, preferably made from Zircaloy, and each rod cluster control tube 15, also preferably made from Zircaloy, occupies the space of and displaces four fuel rods. Hence, there are a total of two hundred and ninety-nine fuel elements 11. The moderator control tubes 14 are arranged in a 5×5 array with an equal pitch between adjacent tubes. For purposes of clarity and understanding, the moderator control tubes 14 are marked with a cross within the circumference thereof while the rod cluster control tubes 15 are marked with double crosses, each offset by an angle of 45°. Since the rod cluster control tubes 15 also form a square array, they are adapted to receive a type of rod control cluster or control rod which is well known in the art.

As can be seen in FIG. 1, each moderator control tube 14 comprises an elongated hollow tube 17 having an upper end plug 18 and a lower end plug 19 fixedly attached thereto such as by welding. End plugs 18 and 19 have openings 20 and 21 therethrough for the flow of either heavy water or regular reactor coolant water, or a combination thereof.

Figure 5:
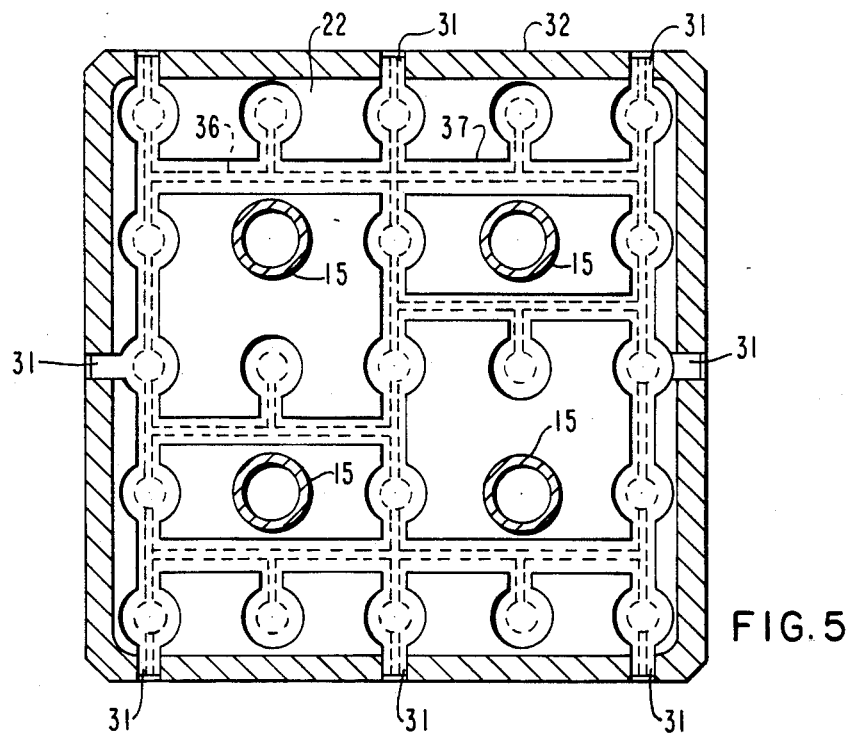
FIG. 5 is a view of the upper manifold taken along the line 5—5 of FIG. 1.
Figure 6:
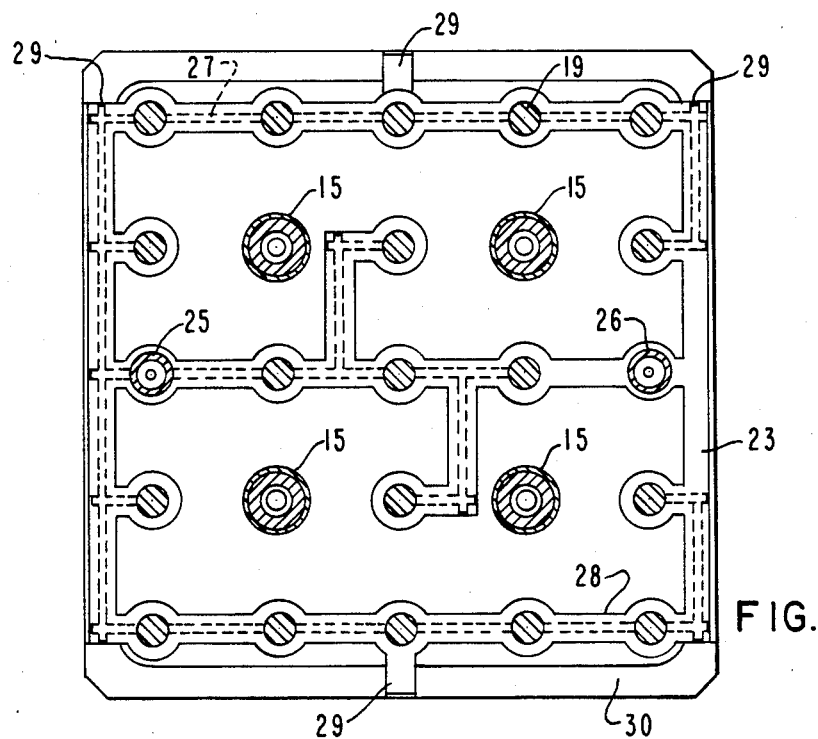
FIG. 6 is a view of the lower manifold taken along the line 6—6 of FIG. 1.

A plan view of the upper manifold 22 is shown in FIG. 5, while a plan view of the lower manifold 23 is shown in FIG. 6. Each manifold 22 and 23 may comprise a Zircaloy casting. The lower end plug 19 of the MCTs 14 is threadingly connected to the lower manifold 23. The upper end plug 18 is flange seated into flanges 24 provided on the underside of the upper manifold 22. In addition, each end of each MCT is welded to its respective manifold for pressure sealing purposes. Guide thimbles 15 pass through and are not connected to either the upper 22 or the lower 23 manifold. This is clearly shown in FIGS. 5 and 6.

A pair of spring loaded connectors 25 and 26 are connected to lower manifold 23 in the manner indicated in FIG. 1. Seal connectors 25 and 26 may be similar to the one described in copending U.S. patent application Ser. No. 626,942, filed July 2, 1984 in the name of L. Veronesi, et al, entitled "Fluid Moderator Control System Fuel Assembly Seal Connector" and assigned to Westinghouse Electric Corporation. Seal connector 25 provides for the inlet of heavy water or a combination of heavy and regular water flowing through the MCTs 14. Seal connector 26 provides for the outlet flow from the one MCT 14 axially aligned therewith. Hence, seal connector 25 provides for the inlet flow for twenty MCTs. The flow communication channels 27 provided in the lower manifold correspond to such an inlet and outlet flow arrangement. Flow channels 27 do not communicate with seal connector 26. Flow channels 27 may be "gun drilled" horizontally through ribs 28 and then plug welded (not shown) at the entrance of the drilled holes to provide flow communication between the twenty MCTs. A vertical through hole is, of course, required in the lower side of lower manifold at each axial location of the seal connectors 25 and 26; while, blind holes drilled through the upper surface of the lower manifold are required at each of the remaining nineteen MCT locations. The lower manifold 23 is seated within cutouts 29 provided in the four sides of lower nozzle 30. The upper manifold (FIG. 5) is similarly seated within cutouts 31 provided in the four sides of the upper nozzle 32. It will thus be appreciated that the lower manifold 23, the MCTs 14, the fuel rods 11, the grids 12 and 13, and the upper manifold 22 comprise a subassembly which is captured between the lower nozzle 30 and the upper nozzle 32. Additionally, there are structural interconnections with the above-stated subassembly and the four guide thimbles 15 which will be more fully explained hereinafter.

The upper manifold 22, at one end of the fuel assembly provides flow communication between each of the twenty-one MCTs as shown in FIG. 5. Flow channels 36 may also be "gun drilled" horizontally through ribs 37 and then plug welded (not shown) at the entrance of the drilled holes. A vertical blind hole is provided in the lower side of the upper manifold 22 at each axial location of the twenty-one MCTs 14. Because of the sealed arrangement between the bottom manifold 23 at a second end of the fuel assembly, the upper manifold 22 at said one end of the fuel assembly, and the MCTs 14, heavy water or a combination of heavy water and regular water may be introduced through seal connector 25 which then flows through flow holes 27 in lower manifold 23, up through twenty MCTs 14, through flow holes 36 in upper manifold 22, and down through the remaining MCT colinearly aligned with seal connector 26 and out said second end of the fuel assembly through seal connector 26. Seal connectors 25 and 26 are adapted to be fitted to the lower core support plate (not shown) and to appropriate flow inlet and outlet channels provided therein.

A structural lower adaptor plate 34 may be integrally formed with lower nozzle 30. Similarly, a structural upper adaptor plate 35 may be integrally formed with the upper nozzle 32. Guide thimbles 15 are structurally connected to the upper 35 and lower 34 adaptor plates. Hence, the upper nozzle 32, the guide thimbles 15, the upper manifold 22, the MCTs 14, the fuel rods 11, the grids 12 and 13, the lower manifold 23, and the lower nozzle 30 together form the structural make-up of fuel assembly 10.

Figure 7:
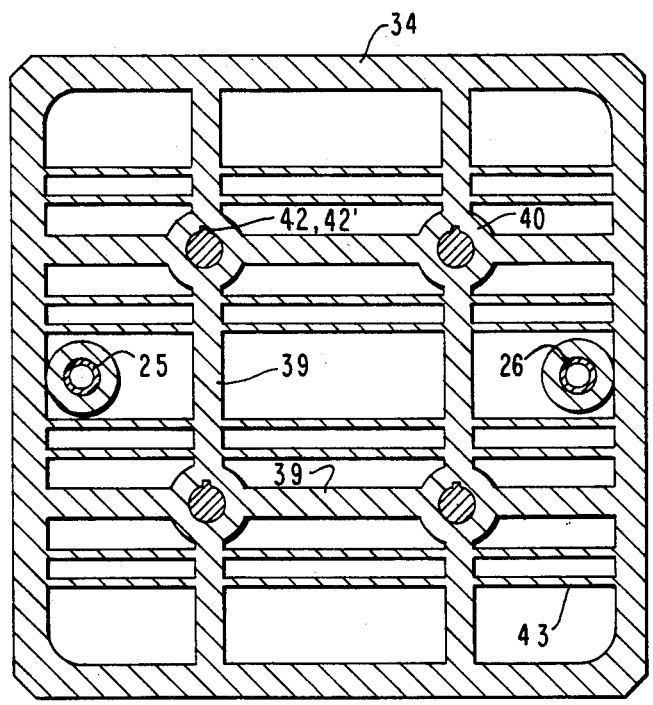
FIG. 7 is a view of the adaptor plate of the bottom nozzle taken along the line 7—7 of FIG. 1; and, FIG. 8 is a cross-sectional view illustrating the connection of the control rod guide thimble to the top nozzle adaptor plate.

Guide thimbles 15 comprise an elongated hollow Zircaloy tube open at its upper end and fitted with a connector plug 38 at its lower end. Guide thimbles 15, as previously stated, are adapted to accept a rod control cluster which is not part of this invention. An internally threaded blind hole is provided in the lower end of plug 38 for purposes of connecting guide thimble 15 to the structural lower adaptor plate 34. Adaptor plate 34 is shown in cross section in FIG. 7 and may be made in the form of a cross beam latice. There are four main beam members 39 having a boss 40 at the intersections thereof. Boss 40 is drilled through to accept a screw or bolt 41 which passes therethrough from the underside thereof and is threadingly engaged with the connector end plug 38 of the guide thimble 15. Thus, the guide thimbles 15 are screw connected to the structural lower adaptor plate 34. In order to prevent twisting of the guide thimble 15 when screw 41 is torque tightened, a groove 42 may be machined in each boss which engages a key 42 provided on the connector plug 38. Screw 41 may be lock welded to boss 40 by a welded lock pin (not shown) which is well known in the art. The adaptor plate 34 also includes eight secondary beams 43 which in conjunction with the lower manifold provide for capture of a portion of the fuel rods 11. The upper adaptor plate 35 in conjunction with the upper manifold 25 provides for capture of the remainder of the fuel rods 11. In this manner, all of the fuel rods 11 are captured from either above or below.

Figure 8:
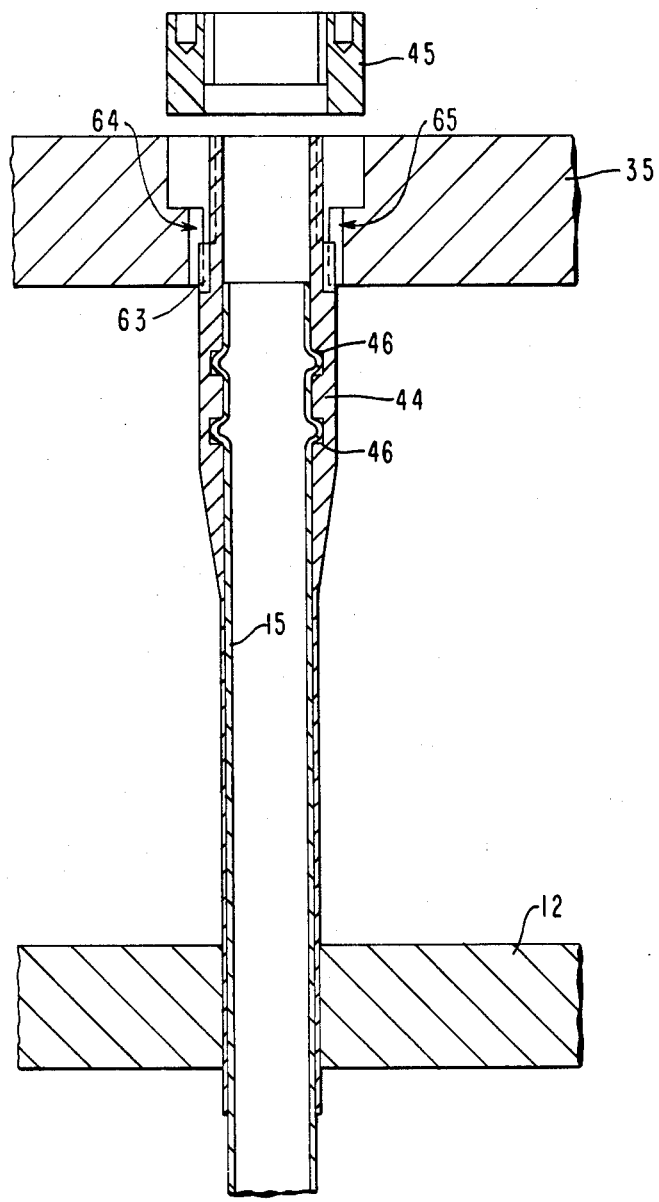

The upper end of the guide thimbles 15 is structurally connected to the upper adaptor plate 35. This is shown in FIG. 8. A machined stainless steel sleeve 44 is positioned within a hole in the upper adaptor plate 35 through the underside thereof. A threaded lock ring 45 engages the upper end of sleeve 44 from the upper side of adaptor plate 35 and is threaded and lock welded (not shown) to the same to prevent the possibility of loosening or disengagement. A key 63 engaged with aligned slots 64 and 65 prevents twisting of sleeve 44 when lock ring 45 is torque tightened. Guide thimble 15 is bulge connected to grooves 46 machined within the inner diameter of sleeve 44. Sleeve 44 extends down from adaptor plate 35 and through upper grid 12. Sleeve 44 is permanently connected to grid 12 such as by brazing or welding.

Figure 3:
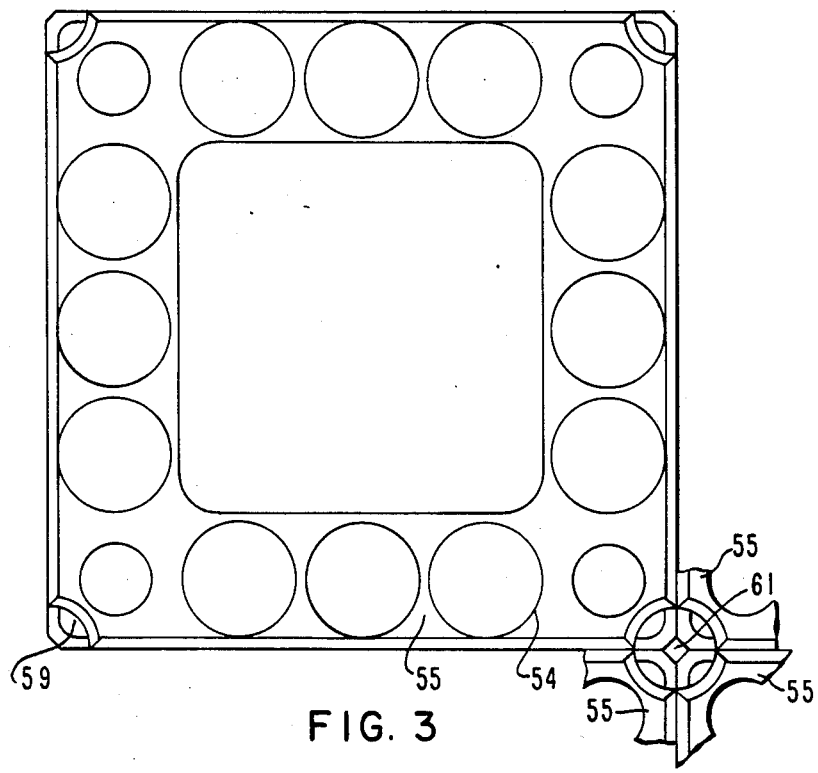
FIG. 3 is a view of the top plate of the upper nozzle taken along the line 3—3 of FIG. 1, not showing the top nozzle springs.
Figure 4:
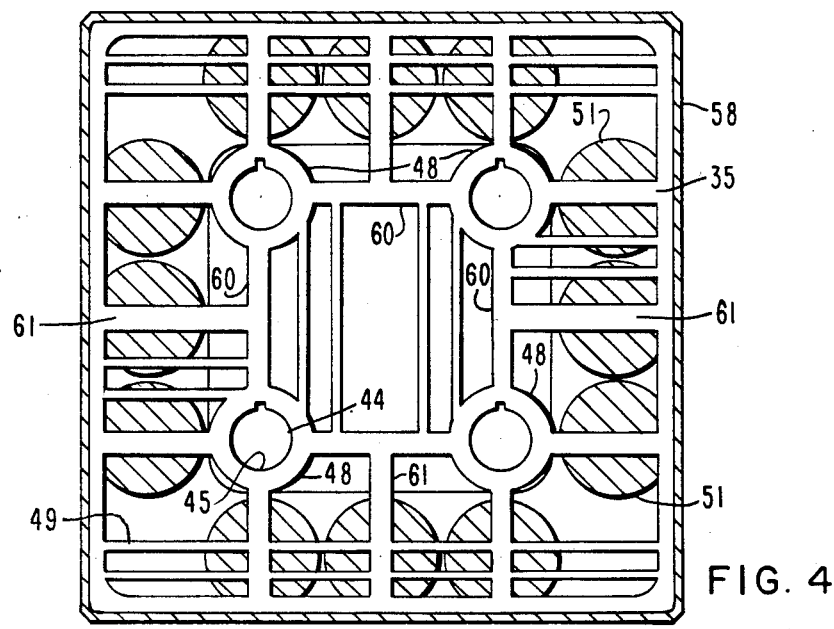
FIG. 4 is a view of the upper adaptor plate taken along the line 4—4 of FIG. 1.

The upper adaptor plate 35 is shown in FIG. 4. Like the lower adaptor plate 34 but at the opposite end thereof, it provides the main structural support of fuel assembly 10. It may be made in the form of a cross beam lattice having four main members 60 having bosses 48 at their intersections to which the guide thimbles 15 are fastened as previously explained. Members 61 are also main support beams. The secondary beams 49 provide additional structural support and in conjunction with the upper manifold 22 provide for upper fuel rod 11 capture. Main members 60 and 61 accept the guide pins 51 for the top nozzle springs 52 which may be helically wound. Guide pins 51 have a slot 50 provided in their lower end which fits over main members 60 and 61 and is welded thereto. Springs 52 extend within retainer sleeves 53 and are mounted around the periphery of the top nozzle 32. Springs 52 seat on the upper adaptor plate 35 and penetrate through holes 54 in the top plate 55 of upper nozzle 32 which are shown in FIG. 3. The inwardly extending flange 57 on the upper end of sleeve 53 in conjunction with retaining ring 56 which is fitted within a circumferential groove in the outer diameter of sleeve 53 provides for capture of the sleeve by top plate 55. The enclosure 58 of top nozzle 32 may be integrally connected to top plate 55 and adaptor plate 35 and as such, structurally connects these two members. Enclosure 58 also provides a plenum for reactor coolant flow exiting from the fuel assembly 10. Quarter circles 59 in each corner of enclosure 58 form a circular hole 61 at the intersection of four adjacent fuel assemblies 10 (see FIG. 3). Circular holes 61 are adapted to receive guide pins (not shown) mounted on the upper core plate to provide for lateral positioning of the upper end of the fuel assemblies 10.

Referring to FIG. 1, it is seen that grids 12 and 13 are positioned at various locations along the length of fuel assembly 10. The grids 12 and 13 serve to space fuel rods 11, moderator control tubes 14, and guide thimble tubes 15 at appropriate distances from each other and to allow the reactor coolant (water) to circulate in heat transfer relationship with fuel rods 11. A more detailed description of a similar grid may be found in U.S. Pat. Nos. 3,379,617 and 3,379,619, both issued in the name of H. N. Andrews, et al. Grids 12 may comprise a spring-dimple design while grids 13 may comprise an all dimple design. Each of the grids 12 and 13 have metal sleeves 47 attached such as by welding or brazing to the grids 12 and 13 at the location of the four guide thimbles 15 and the twenty-one moderator control tubes 14. Sleeves 47 are bulge attached 48 only to the guide thimbles 15 which is well known in the art. The moderator control tubes 14 pass through sleeves 47 but are not attached thereto; the sleeves only provide guidance and bearing surfaces for the MCTs 14.

In accordance with the above, the invention provides new, novel, and useful apparatus comprising a fuel assembly for use with a pressurized water nuclear reactor which allows for spectral shift control by providing means for varying the reactor coolant water volume over a fuel cycle by replacing a portion of the water with heavy water during the early stages of core life and then replacing it with ordinary water as the core life decreases.

While the invention has been described, disclosed, illustrated and shown in certain terms or certain embodiments or modifications which it has assumed in practice, the scope of the invention is not intended to be nor should it be deemed to be limited thereby and such other modifications or embodiments as may be suggested by the teachings herein are particularly reserved especially as they fall within the breadth and scope of the claims here appended.

We claim as our invention:

1. A fuel assembly adapted for use with a pressurized water nuclear reactor having capabilities for fluid moderator spectral shift control comprising:

a plurality of parallel arranged elongated nuclear fuel elements;

means for providing for axial support of said fuel elements and for arranging said fuel elements in a spaced array;

a plurality of guide thimbles interspersed among said fuel elements adapted for insertion of a rod control cluster therewithin;

means for structurally joining said fuel elements and said guide thimbles;

fluid moderator control means for providing a volume of low neutron absorbing fluid within the fuel asembly and for removing a substantially equivalent volume of reactor coolant water therefrom, said fluid moderator control means including a plurality of moderator control tubes interspersed among said fuel elements and guide thimbles containing said rod control cluster, said moderator control tubes being sealingly separated from said reactor coolant water;

a first flow manifold at one end of said fuel assembly sealingly connected to a first end of said moderator control tubes whereby said first ends are commonly flow connected; and a second flow manifold, having an inlet passage and an outlet passage therein, sealingly connected to a second end of said moderator control tubes, at a second end of said fuel assembly, said one of said moderator control tubes being flow separated by separate flow channels within said second manifold from the remainder of said moderator control tubes, whereby said fluid moderator has inlet flow through said second manifold to said remainder of moderator control tubes, and outlet flow from said fuel assembly through said one of said moderator control tubes at said second end of said fuel assembly.

2. The fuel element of claim 1 including an inlet flow passage in said second manifold and an outlet flow passage in said second manifold said inlet flow passage being adapted to be connected to a supply of low neutron absorbing fluid whereby said low neutron absorbing fluid enters said second manifold filling one of the separate flow channels therein, fills a plurality of said moderator control tubes, fills said first manifold, fills the remainder of said moderator flow tubes comprising at least one of said tubes, fills the remaining separated flow channel in said second manifold and then exits through said outlet passage of said second manifold.

3. The fuel assembly of claim 2 wherein said means for structurally joining said fuel elements and said guide thimbles comprise a first support plate attached to one end of said guide thimbles and a second support plate attached to the other end of said guide thimbles, said guide thimbles being bolted at said one end to said second support plate and connected at said other end by a sleeve which is threadingly connected to said first support plate with said other end of said guide thimble being inserted within said sleeve and bulge attached thereto.

4. The fuel assembly of claim 3 wherein said fuel element axial support and spacing means comprise at least one grid comprising a first plurality of parallel arranged straps which intersect with and are attached to a second plurality of parallel arranged straps so as to form a plurality of substantially square openings, and wherein each of said fuel elements pass through one of said openings and wherein each of said guide thimbles pass through one of said openings, and said guide tube openings having a sleeve fixedly attached thereto and extending therefrom, said guide tube being fitted within said sleeve and bulge attached thereto.

5. The fuel assembly of claim 4 wherein each of said moderator control tubes pass through one of said openings in said grid, said moderator tube openings having a sleeve fixedly attached thereto and extending therefrom, and wherein each of said moderator tubes pass through one of said sleeves.

6. The fuel assembly of claim 5 including a first flow nozzle attached to said first support plate and a second flow nozzle attached to said second support plate, said flow nozzles being adapted to direct reactor coolant flow to and from said fuel assembly, said flow nozzles each comprising a hollow box member substantially colinearly aligned with the array of fuel elements therebetween.

7. The fuel assembly of claim 6 wherein each of said manifolds respectively fit within cutouts provided in said flow nozzles.

8. The fuel assembly of claim 6 including a quarter-circle cutout in each corner of said hollow box member at one end thereof.

9. The fuel assembly of claim 1 wherein said means for structurally joining said fuel elements and said guide thimbles comprise a first support plate attached to one end of said guide thimbles and a second support plate attached to the other end of said guide thimbles, said guide thimbles being bolted at said one end to said second support plate and connected at said other end by a sleeve which is threadingly connected to said first support plate with said other end of said guide thimble being inserted within said sleeve and bulge attached thereto.

10. The fuel assembly of claim 9 wherein said fuel element axial support and spacing means comprise at least one grid comprising a first plurality of parallel arranged straps which intersect with and are attached to a second plurality of parallel arranged straps so as to form a plurality of substantially square openings, and wherein each of said fuel elements pass through one of said openings and wherein each of said guide thimbles pass through one of said openings, and said guide tube openings have a sleeve fixedly attached thereto and extending therefrom, said guide tube being fitted within said sleeve and bulge attached thereto.

* * * * *